(12) United States Patent
Goodson et al.

(10) Patent No.: US 7,607,854 B1
(45) Date of Patent: Oct. 27, 2009

(54) VARIABLE ANGLE STANDOFF

(75) Inventors: R. Talley Goodson, Salt Lake City, UT (US); William Gatti, Sandy, UT (US)

(73) Assignee: 3form, Inc., Salt Lake City, UT (US)

( * ) Notice: Subject to any disclaimer, the term of this patent is extended or adjusted under 35 U.S.C. 154(b) by 569 days.

(21) Appl. No.: 11/424,212

(22) Filed: Jun. 14, 2006

Related U.S. Application Data

(60) Provisional application No. 60/690,839, filed on Jun. 15, 2005.

(51) Int. Cl.
*F16C 11/00* (2006.01)
(52) U.S. Cl. ............... 403/73; 403/43; 403/127; 403/128; 403/56; 403/75; 403/78; 403/113; 403/119; 403/345; 403/365; 403/366; 403/373; 403/377; 52/204.66; 52/213
(58) Field of Classification Search ............... 285/223, 285/226, 233, 146.1; 403/43, 220, 91, 127–128, 403/56, 73–75, 78, 113, 119, 345, 365–366, 403/373, 377; 52/204.1, 210, 213, 204.5, 52/204.65, 204.66
See application file for complete search history.

(56) References Cited

U.S. PATENT DOCUMENTS

| | | | | |
|---|---|---|---|---|
| 2,878,542 A | * | 3/1959 | Summers et al. | ............ 411/555 |
| 4,022,140 A | * | 5/1977 | Lienemann | ............ 112/199 |
| 4,753,510 A | * | 6/1988 | Sezerman | ............ 385/61 |
| 4,986,059 A | * | 1/1991 | Boutilier | ............ 54/2 |
| 6,371,628 B1 | * | 4/2002 | Ward | ............ 362/287 |
| 7,005,568 B2 | * | 2/2006 | Hsieh | ............ 84/422.1 |
| 7,423,211 B2 | * | 9/2008 | Hsieh | ............ 84/421 |
| 7,487,980 B2 | * | 2/2009 | Goddard et al. | ............ 280/63 |
| 2004/0032123 A1 | * | 2/2004 | Chu | ............ 285/223 |

FOREIGN PATENT DOCUMENTS

CA  2524449 A1 * 4/2007

* cited by examiner

*Primary Examiner*—Jeanette E. Chapman
(74) *Attorney, Agent, or Firm*—Workman Nydegger

(57) ABSTRACT

A variable angle standoff in accordance with an implementation of the present invention includes one or more bearing interfaces, which, in concert with other beveled components (e.g., beveled rings), fastens about a wide range of panel and/or object dimensions. In one implementation, a threaded fastener is inserted through a first bearing interface, which interfaces with a first beveled ring. The threaded fastener further threads through one or more panel and/or object eyelets, through a second beveled ring, through a second bearing interface, and ultimately into a standoff shaft. Despite relatively tight fastening of the threaded fastener to the standoff shaft, the first and second beveled rings can accommodate object curvature by rotating in any of an X, Y, and/or Z dimension, as needed.

20 Claims, 6 Drawing Sheets

VARIABLE ANGLE STANDOFF

CROSS-REFERENCE TO RELATED APPLICATIONS

The present invention claims the benefit of priority to U.S. Provisional Patent Application No. 60/690,839, filed on Jun. 15, 2005, entitled "Variable Angle Standoff," the entire contents of which are incorporated by reference herein.

BACKGROUND OF THE INVENTION

1. The Field of the Invention

The present invention relates to systems and apparatus configured for securing resin panels to a wall, floor, or ceiling structure.

2. The Relevant Technology

Some recent architectural designs have implemented synthetic, polymeric resins, which can be used as partitions, walls, décor, etc., in offices and homes. Present polymeric resin materials generally used for creating these resin panels comprise polyvinyl chloride or "PVC"; polyacrylate materials such as acrylic, and poly (methylmethacrylate) or "PMMA"; polyester materials such as poly (ethylene-co-cyclohexane 1,4-dimethanol terephthalate), or "PET"; poly (ethylene-co-cyclohexane 1,4-dimethanol terephthalate glycol) or "PETG"; glycol modified polycyclohexylenedimethlene terephthalate; or "PCTG"; as well as polycarbonate materials.

In general, resin materials such as these are now popular compared with decorative cast or laminated glass materials, since resin materials can be manufactured to be more resilient and to have a similar transparent, translucent, or colored appearance as cast or laminated glass, but with less cost. Decorative resins can also provide more flexibility, compared with glass, in terms of color, degree of texture, gauge, and impact resistance. Furthermore, decorative resins have a fairly wide utility since they can be formed to include a large variety of artistic colors, images and shapes.

For example, resin materials can be formed for flat or three-dimensional (i.e., curved) formations, such as with compound curvatures. The curved decorative resin panels can then be used in architectural environments, such as when decorating an existing wall or ceiling, or when used as a new wall partition. Mounting the formed resin panel into the appropriate position, however, can be difficult. For example, the curved resin panel could be inserted into a frame, such as a wood or steel frame that is configured with curving that corresponds to the resin panel. Constructing such a frame, however, can be difficult, if not prohibitively expensive for relatively complex curvatures. In particular, even slight mismatches in frame design can result in stress and/or cracking of the resin panel.

Other conventional solutions for mounting resin panels to a structure (e.g., wall, ceiling, or corresponding frame) include using one or more standoffs. In one use, conventional standoffs allow a resin panel to be mounted so that light can pass between the resin panel and the mounting structure. In particular, the conventional standoff positions a resin panel at a "standoff" position with respect to the wall, where the standoff position is a distance defined generally by a length of a portion of the standoff (i.e., the standoff barrel).

As illustrated by the FIG. 1 depiction of known art, for example, a conventional standoff (e.g., 105) includes a barrel (e.g., 115) that attaches to the given support structure (e.g., 150) on one end, and a cap (e.g., 110) that has a threaded stem configured to twist inside the barrel on an opposing end. The cap and barrel structures are generally configured to screw together with substantially flat, opposing surfaces. For example, the standoff cap (e.g., 110) and stem might be threaded through one side of a given perforation in a resin panel (e.g., 100). The cap and stem of the standoff might then be screwed into the standoff barrel (e.g., 115) on an opposing side of the resin panel perforation. Unfortunately, this standoff and resin panel assembly is less suitable for use with mounting curved resin panels.

As shown in the top view of FIG. 1B, for example, the flat surfaces of the conventional standoff cap 110 and barrel 115 provide little or no three-dimensional adjustability against a curved resin surface. In particular, one or more gaps 120a, 120b may be created due to a geometric mismatch between the interface between standoff cap 110 and barrel 115 compared with the curvature of resin panel 100. As a result, a manufacturer trying to use a conventional standoff with a curved resin panel will likely attach the conventional standoff too loosely or too tightly against the resin panel and frame. One can appreciate that too loose of a bind can result in inappropriate shifting of the resin panel. By contrast, attaching the resin panel to the standoff too tightly can result in one or more components of the standoff digging into the resin panel curvature, which can result in cracks or fissures (e.g., 104) of the resin panel.

Accordingly, an advantage in the art can be realized with apparatus that readily accommodate curvatures in an object to be mounted to a support structure.

BRIEF SUMMARY OF THE INVENTION

Implementations of the present invention solve one or more of problems in the art with systems and apparatus configured to efficiently mount curved portions of an object (e.g., a resin—or glass—based panel) to a structure. For example, at least one implementation of the present invention includes a variable angle standoff. The variable angle standoff can be configured to mount a curved portion of an object to a structure, such as a support frame, a wall, a ceiling, or a floor.

For example, a variable angle standoff for securing a panel to a structure in a manner that accommodates dimensional variation in the panel, and in a manner that avoids causing potentially destructive stress to the panel, can include a standoff barrel. The variable angle standoff can also include a first bearing interface configured to rotatably secure a first side of an object. In addition, the variable angle standoff can include a second bearing interface configured to rotatably secure a second side of the object. Furthermore, the variable angle standoff can include a fastener configured to thread through the first bearing interface, the first and second sides of the object, the second bearing interface, and into the standoff barrel. As such, the object can be adjustably positioned along a length of the fastener.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Implementations of the present invention extend to systems and apparatus configured to efficiently mount curved portions of an object (e.g., a resin—or glass—based panel) to a structure. For example, at least one implementation of the present invention includes a variable angle standoff. The variable angle standoff can be configured to mount a curved portion of an object to a structure, such as a support frame, a wall, a ceiling, or a floor.

As will be understood more fully from the present specification and claims, the variable angle standoff (or "adjustable standoff means") described and shown herein can provide a number of unique features. For example, at least one feature provided by an exemplary variable angle standoff is the ability to efficiently secure one or more panels at a standoff position with respect to an existing support structure. At least another feature provided by an exemplary variable angle standoff is the ability to provide flush (or substantially flush) attachment between the variable angle standoff and curvatures in a panel, and thus securely fasten the curved portions of the panel without necessarily imparting undue stress to the panel.

As a preliminary matter, implementations of the present invention are described herein primarily with reference to mounting panels, such as resin panels. One will appreciate, however, that a panel, particularly a resin-based panel, is only one type of "object" with which the variable angle standoff(s) described herein can be used. For example, the variable angle standoff can be used to mount not only resin "panels," as such, but also glass panels, to a given support structure. Furthermore, one will appreciate that the variable angle standoff can also be used to mount other types of curved surfaces having different material compositions, such as objects comprising wood, stone, fiberglass, or the like, which may or may not exhibit primarily panel-like dimensions. Reference herein, therefore, to panels, or even resin panels, as such, is primarily for convenience in description.

Figure 1A:
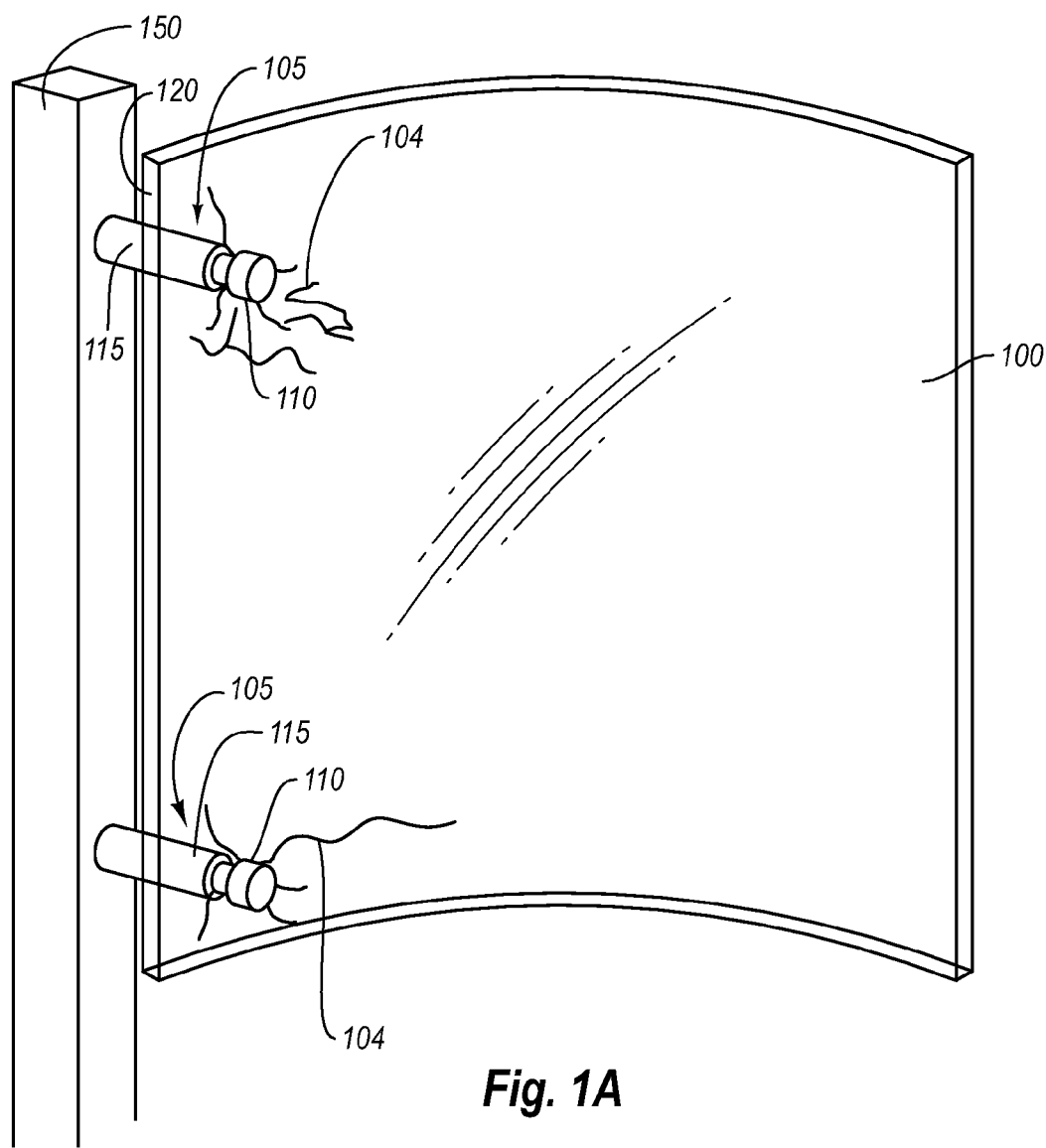
FIG. 1A illustrates a facing perspective view of a bowed panel mounted to a support structure with a conventional standoff, which results in one or more cracks and fissures.
Figure 1B:
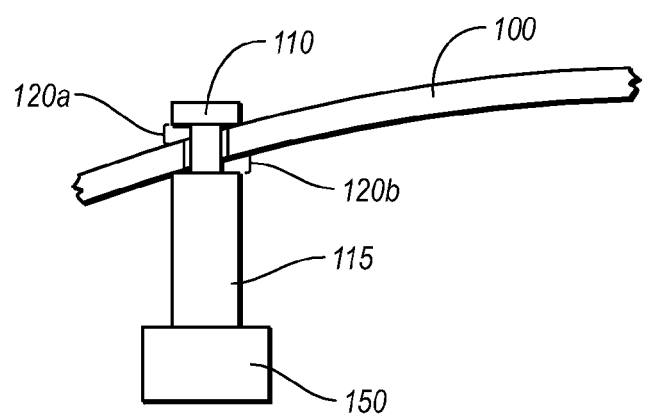
FIG. 1B illustrates a top view of the conventional standoff illustrated in FIG. 1A.
Figure 2A:
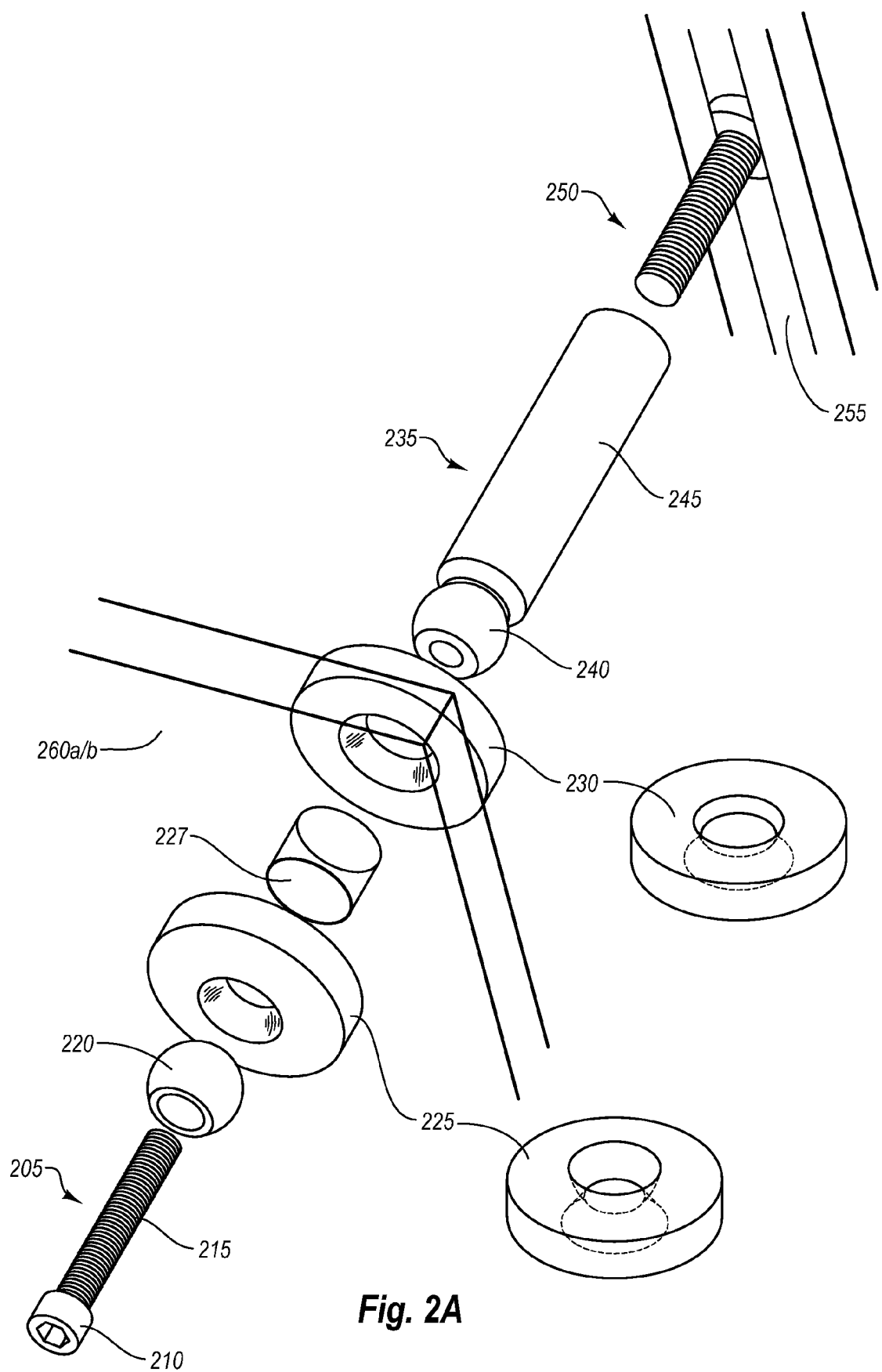
FIG. 2A illustrates an exploded perspective view of a variable angle standoff in accordance with an implementation of the present invention and corresponding panel to be mounted with the variable angle standoff.

FIG. 2A illustrates an exploded perspective view of one example of a variable angle standoff 200 that can be used to secure curved panels (e.g., curved resin panels), such as panel 260a. On one end, variable angle standoff 200 comprises a generally cylindrical standoff barrel 235, which includes a bearing interface 240 connected to a shaft 245. As shown, standoff barrel 235 defines a longitudinal, cylindrical profile within which virtual all of the standoff components will fit or be aligned, except in this case, of course, rings 225, 230, which define a broader cylindrical profile in combination. This dimensional layout, however, is only one way of practicing implementations of the present invention. For example, a manufacturer can use a cylindrical barrel that has a broader diameter, such that all of the components of the variable angle standoff fit within a single longitudinal, cylindrical profile.

FIG. 2A shows that shaft 245 can be configured to mount to a threaded means (e.g., threaded member 250) on one end. For example, shaft 245 can include a tapped recess (not shown) into which threaded member 250 can be fastened. Threaded member 250, in turn, can also be configured to screw into any appropriate support structure (e.g., 255), such as into one or more reciprocally threaded recesses or nuts embedded within support structure 255.

On the opposing end, FIG. 2A further shows that standoff barrel 235 can also comprise bearing interface 240, which further comprises a perforation that is configured to allow another threaded means (e.g., threaded fastener 205) entry into the tapped recess (or cavity) of shaft 245. In one implementation, the tapped recess for receiving threaded member 250 and for receiving threaded fastener 205 is the same tapped recess, although this is not required. For example, the tapped recess for receiving threaded member 250 into shaft 245 can be differently sized compared with a tapped recess in shaft 245 for receiving threaded fastener 205.

FIG. 2A further shows, therefore, that at least one implementation of variable angle standoff 200 can comprise a threaded fastener 205. In particular, FIG. 2A shows that threaded fastener 205 includes fastener head 210, which is connected to threaded portion 215. In general, threaded portion 215 defines a length and/or longitudinal dimension of fastener 205. In addition, fastener head 210 can be configured with fittings for turning threaded fastener 205 into the tapped recess(es) of shaft 245, such as one or more internal bevels configured to fit any one or more of an "allen," "phillips," or "flathead" fitting. Similarly, fastener head 210 can also be configured as a nut interface for receiving one or more socket and/or wrench fittings.

In order to thread through to shaft 245, threaded portion 215 is configured with sufficient diameter, and/or with sufficient threading to be removably inserted within the cavities of first and second bearing interfaces 220 and 240, first and second beveled rings 225 and 230, and, of course, within the tapped recess of shaft 245. Similarly, each bearing interface 220, 240, as well as each beveled ring 225, 230 can be configured with sufficient perforation dimensions to allow threaded portion 215 to pass at least partially through.

In addition, FIG. 2A shows that first beveled component (hereinafter "ring") 225 is configured to interface with first bearing interface 220, and that second beveled component (hereinafter "ring") 230 is also configured to interface with second bearing interface 240 when assembled with fastener 205. One will appreciate with respect to these interfaces that a manufacturer can configure the shape and depth of the cavities within first and second beveled rings 225 to ensure an appropriate degree of rotation about first and second bearing interfaces 220 and 240. In at least one implementation, for example, each first and second bearing interface 220, 240 comprises a portion that is at least partially rounded. The at least partially rounded portion of the given bearing interface 220, 240 will ultimately fit within a reciprocally rounded bevel portion of beveled rings 225 and/or 230, and thus be at least somewhat conically-shaped therein. In at least one implementation, the interface between the rounded bearing interface shape compared to the shape and/or depth of the bevel within beveled ring 225 or 230 provides the given ring with a degree of rotation about an X, Y, and/or Z axis.

On will appreciate that, in addition to providing rotation interfaces, these and other configurations of the bearing interfaces and bevels further provide various entry as well as holding points for threaded fastener 205. In one implementation, for example, bearing interface 220 has a perforation that can comprise an entry and exit point, where the entry is generally a larger opening and the exit is generally a smaller opening. The threaded fastener 205 can thus be configured to enter the larger circumference opening of the bearing interface 220, but stopped from passing completely through the beveled ring 225 due to a discrepancy in the size of fastener head 210 compared to the size of the initial or even subsequent opening (i.e., exit point) in bearing interface 220.

Figure 2B:
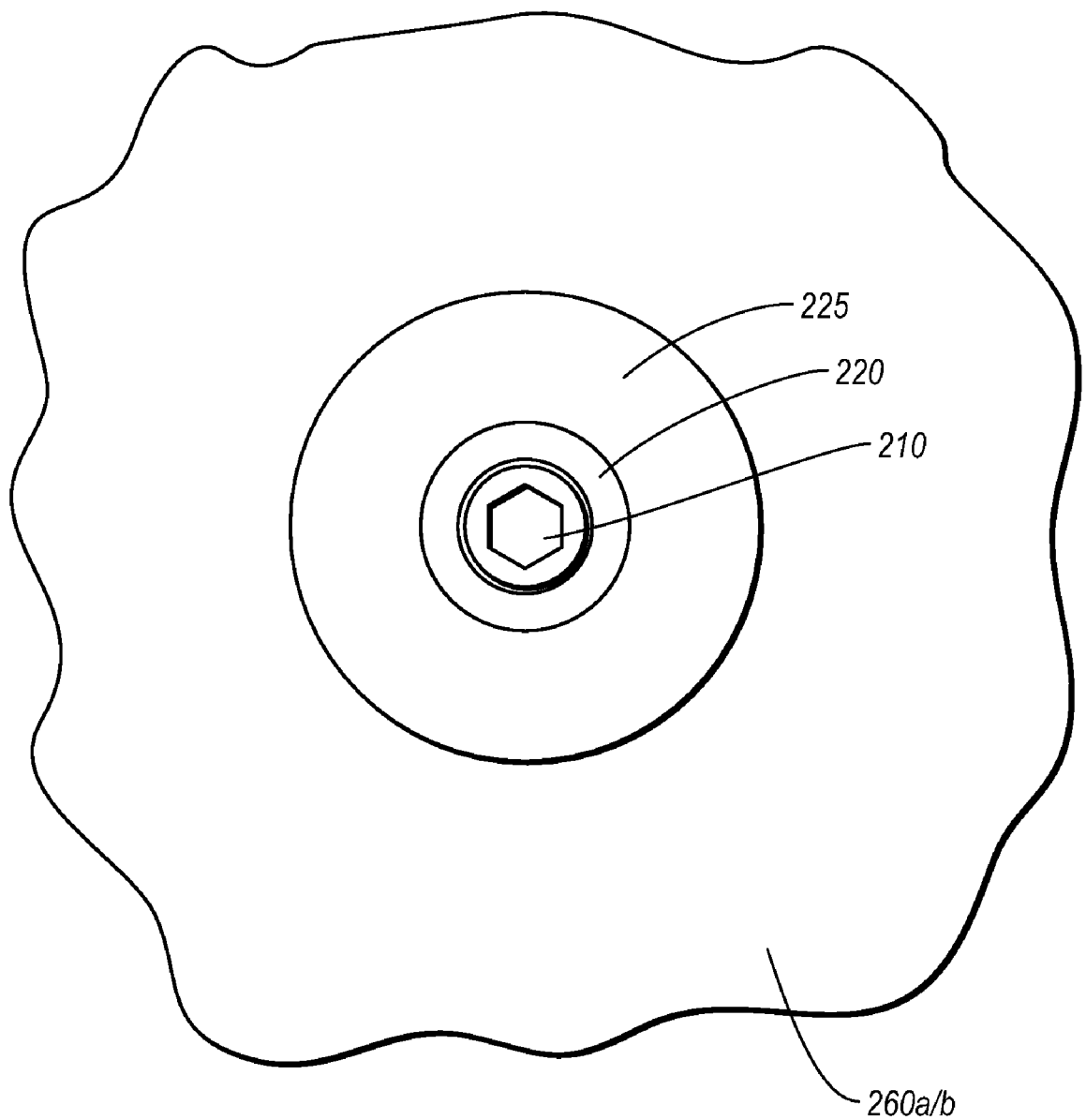
FIG. 2B illustrates a facing view of the variable angle standoff shown in FIG. 2A when mounted to a panel.

As shown in FIG. 2B, for example, the relatively wide fastener head 210 will ultimately lie, in at least one implementation, in the center of bearing interface 220. Similarly, bearing interface 220, which is configured to prevent fastener head 210 at least from completely passing through its perforation, will typically lie in the center of beveled component 225 from at least the front facing perspective. Beveled ring 225, in turn, will lie substantially flush (e.g., compared with gaps 120*a-b* in conventional components) with the resin panel 260*a/b*, since its diameter precludes passing through panel eyelet 227, and so forth.

FIGS. 2A and 2B also show that first beveled ring 225, similar to the first bearing interface 220, allows for entry and exit of the threaded portion 210 of fastener 205. In particular, the manufacturer inserts threaded portion 215 through first bearing interface 220, and through first beveled ring 225. Due at least in part to the slight geometric discrepancies described above, only threaded portion 215 passes through first bearing interface 220, first beveled ring 225, resin eyelet 227, and also through the perforation of second beveled ring 230. Ultimately, therefore, the manufacturer can assemble the variable angle standoff 200 about resin panel 260*a/b* by securing threaded portion 215 into the tapped recess (i.e., threaded cavity) of shaft 245.

The manufacturer can then tighten the thread portion 215 with respect to shaft 245 as necessary for appropriate securing forces. Notwithstanding any particular tightness, however, the geometric configurations of each first and second bearing interface 220, 240 compared to each corresponding beveled ring 225, 240 still accommodate a wide range of curvatures in panel 200. In particular, beveled rings 225, 240 can be considered a single, varying interface, which varies with the curvature of a panel, and thus is more likely to be flush with the panel curvature than conventional standoff components. That is, the varying interface of variable angle standoff 200 can accommodate a change in panel curvature without necessarily loosening any one or more of a mount of the panel 260*a* to the support structure 255 (e.g., by loosening threaded member 250) or loosening a mount of the panel to the variable angle standoff (e.g., by loosening threaded portion 215).

Figure 2C:
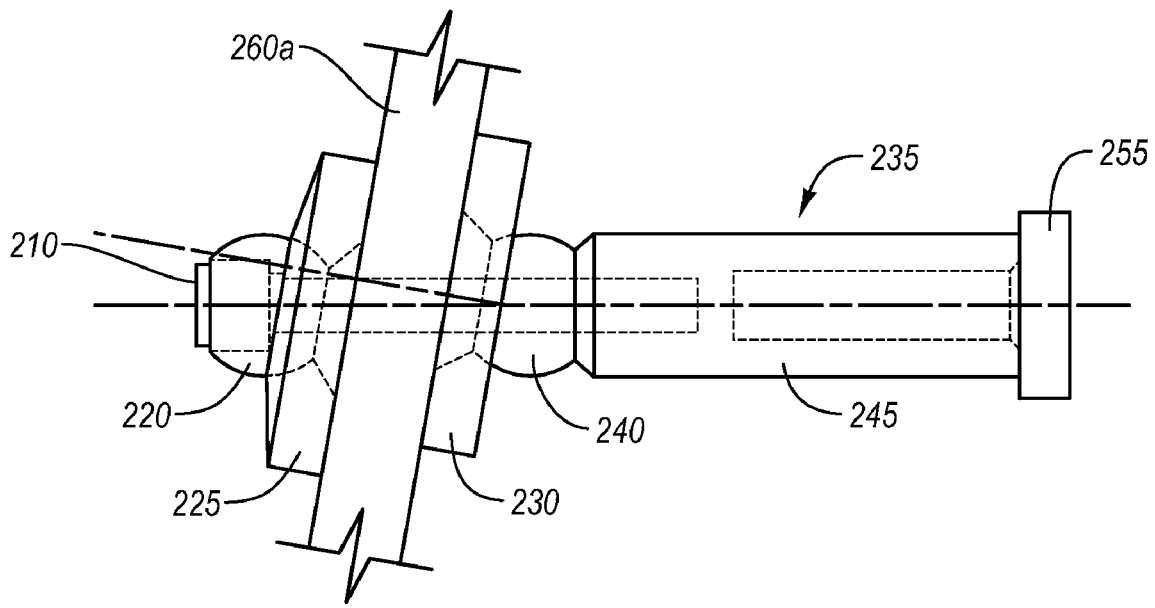
FIG. 2C illustrates a top view in accordance with an implementation of the present invention of the variable angle standoff show in FIG. 2A, in which the variable angle standoff is used to mount a curved portion of a panel at one angle to a support structure.
Figure 2D:
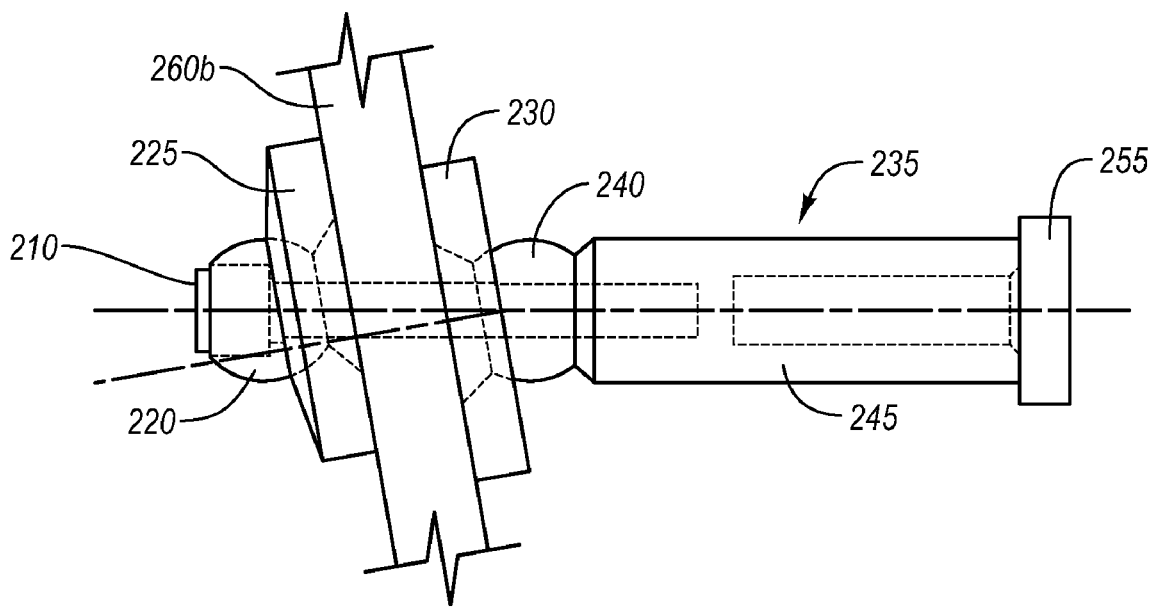
FIG. 2D illustrates an alternate top view in accordance with an implementation of the present invention in which the variable angle standoff is used to mount a different curved portion of a panel at a different angle to the support structure.

As shown in FIG. 2C, for example, the varying interface of beveled rings 225 and 230 can rotate about corresponding bearing interfaces 220, 240 along any one or more of an X, Y, or Z axis to accommodate angles and/or curvature in panel 260*a* in at least one direction. In addition, such as shown in FIG. 2D, the varying interface (e.g., rotating rings 225, 230) of variable angle standoff 200 can accommodate a different panel 200*a* of different curvature, or can be used with the same previous panel 260*a* after that panel were twisted or otherwise maneuvered to create an opposing angle. Specifically, beveled rings 225 and 230 could just as easily rotate again (or in continuous fashion) about bearing interfaces 220, 240 to accommodate a different curvature, as needed.

One will appreciate, therefore, that this accommodation by a single variable angle standoff 200 can all be done, in at least one implementation, without necessarily disturbing the tightness of threaded fastener 205 with respect to shaft 245. Such accommodation can also be done without necessarily having to adjust standoff barrel 235 with respect to support structure 255. That is, the beveled rings 225, 230 are able to maintain a relatively flush interface to a curved portion of a panel, almost regardless of the direction of curve angle in the panel. The beveled rings 225, 230 can simply just rotate into an appropriate position, as needed.

Figure 3A:
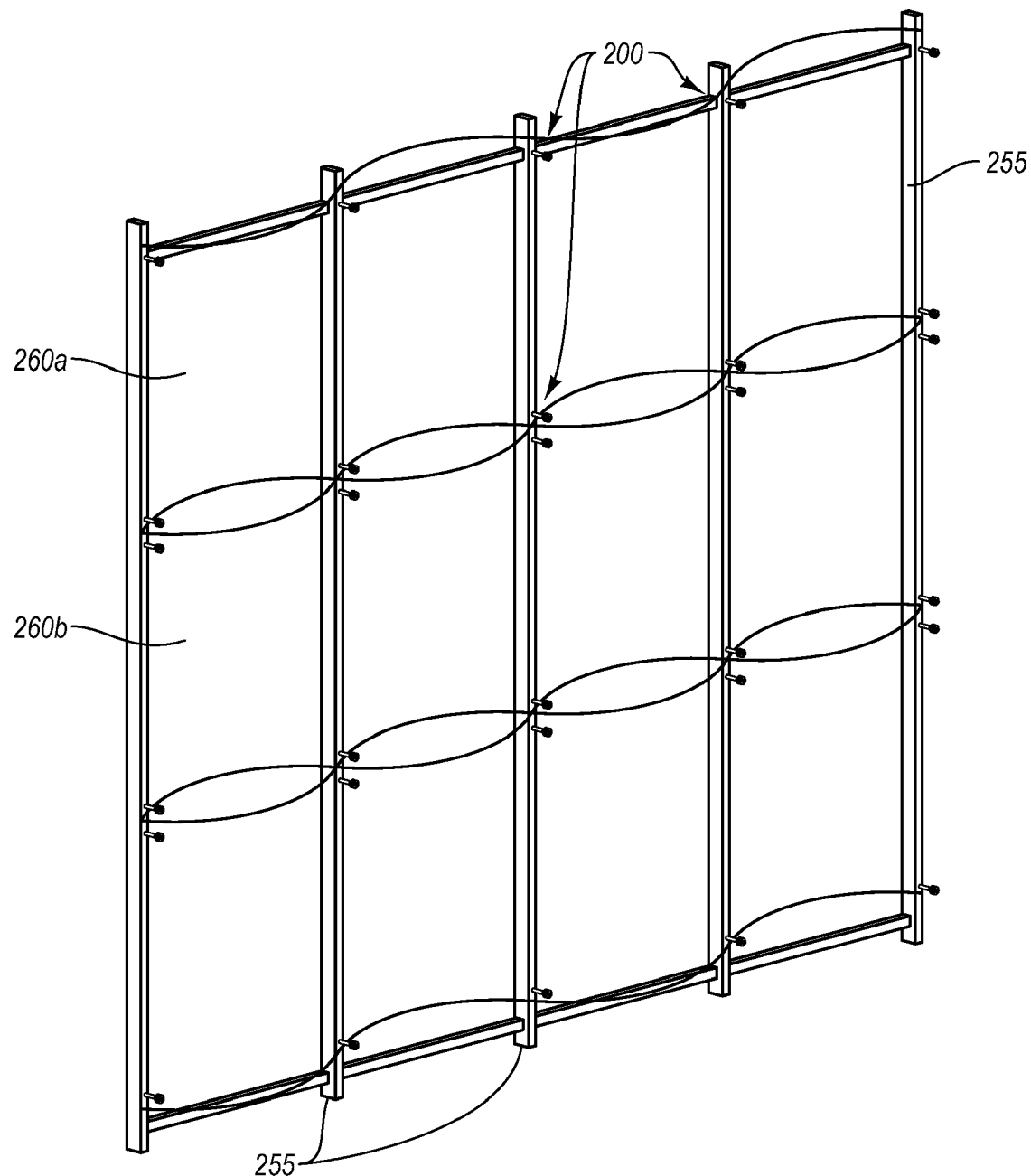
FIG. 3A illustrates a perspective overview in accordance with an implementation of the present invention in which one or more variable angle standoffs are used to mount one or more curved panels to one or more support structures.
Figure 3B:
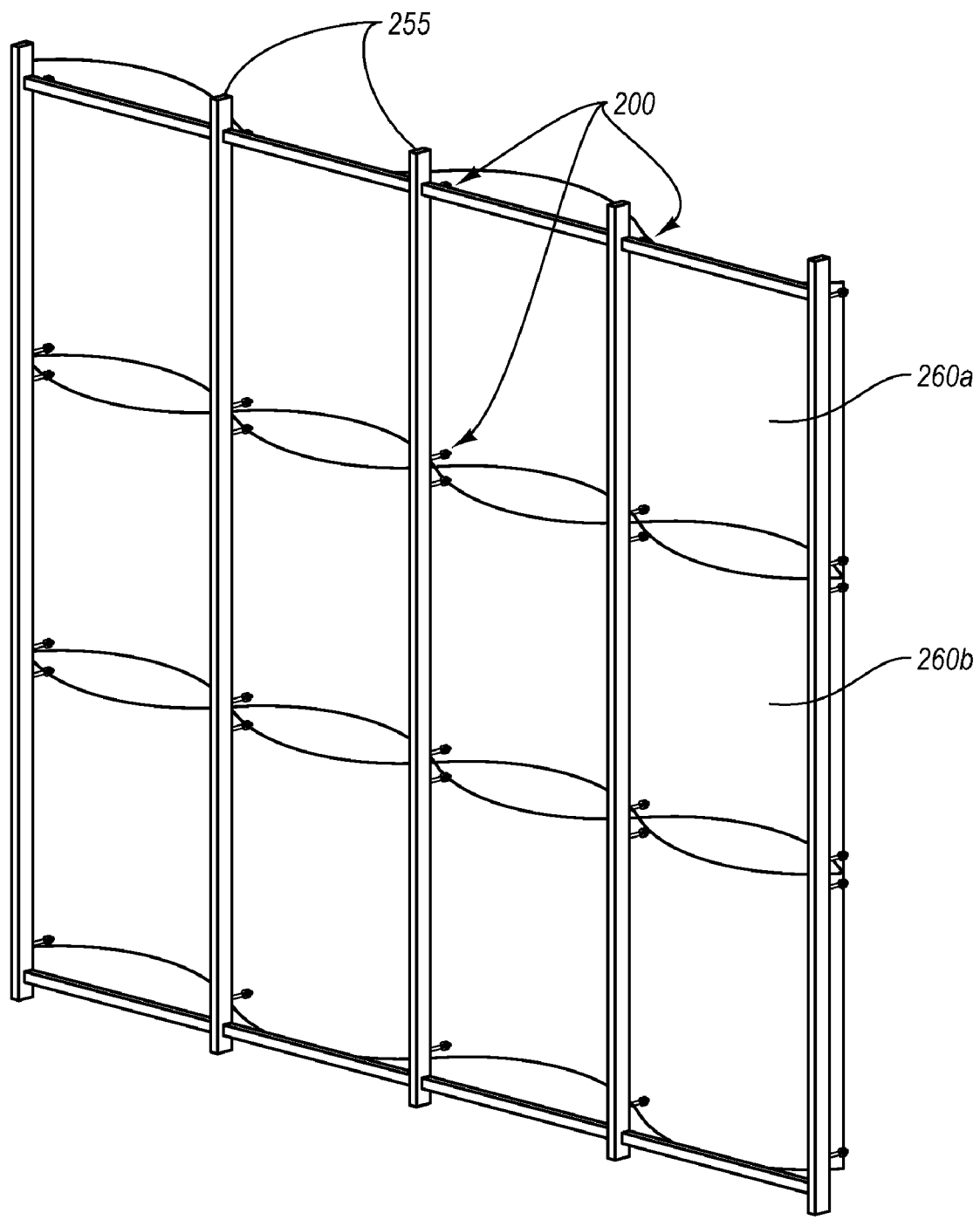
FIG. 3B illustrates a back perspective view of the panel mounts and corresponding structures illustrated in FIG. 3A.

FIGS. 3A and 3B illustrate opposing perspective views of one or more curved resin panels 200 used in a system comprising panels (e.g., 260*a*, 260*b*, etc.) that are alternated and stacked with opposing curvatures, and mounted to a support structure using an adjustable standoff means, such as variable angle standoff 200. In particular, FIGS. 3A and 3B illustrate opposing front and back perspective views of the resin panels 260*a-b* when mounted at least to support structures 255. As shown, each standoff 200 is substantially the same length between a given frame member 255 and the resin panel 260*a-b*. Curvature can be made by securing panels to support structures 255, where the panels 260*a-b* have eyelets spaced apart in a horizontal dimension at slightly greater distances than the horizontal distance of adjacent variable angle standoffs 200. As previously described, the variability of X, Y, and Z alignment of the beveled rings 225, 240 on each variable angle standoff 200 accommodates these and other variations in panel dimensions.

Accordingly, the inventive schematics and components described herein provide a number of elements that can be used by a manufacturer to efficiently mount panels of virtually any type of dimension, shape, or curvature to a support structure. One will appreciate that the components described herein can provide a number of advantages over conventional components, such as by providing secure, essentially flush and secure mountings of curved panels/objects, without necessarily imparting undue stress to the given panels, which might crack the panels.

One will appreciate, of course, that the systems and components described herein can be widely varied within the spirit of the present invention. For example, a variable angle standoff need not necessarily be circular or cylindricallyshaped, such as shown or described primarily herein. In addition, the beveled components need not necessarily be disc shaped, or even flat discs at all. For example, FIG. 2A shows that beveled components 225 and 230 are primarily flat discs, while FIGS. 2C and 2D show that at least beveled component 225 can alternatively comprise a somewhat conically shaped disc. One will appreciate that each depicted shape of the given beveled component/ring (225 and/or 230) can vary as desired by the manufacture as needed for any range of functional and/or aesthetic purposes.

Furthermore, panels and/or objects to be secured need not necessarily only be "curved." In particular, so long as there exist appropriate bearing interface and bevel configurations that allow beveled component fluctuation (i.e., X/Y/Z variation) with respect to the standoff and, the variable angle standoff 200 can be any shape or size, as appropriate. Furthermore, the variable angle standoff can be made of any type of appropriate material, and can be configured to mount to any type of variably shaped object.

In addition, both the recesses and/or perforations of each beveled component (e.g., ring or equivalent) can be adjusted in any number of ways for additional X/Y/Z variation, and or to further accommodate or hide a fastener head 210 and/or a first or second bearing interface. For example, although FIGS. 2C and 2D show first bearing interface 220 and/or fastener head 210 extending somewhat from first bearing interface 225, the dimensions of each such component can be configured so that fastener head 210 and/or bearing interface 220 are flush within beveled ring 220.

In addition, it is not always necessary to use both first and second bearing interfaces 220, 240 and first and second beveled rings 225, 230 (or equivalent) at the same time. For example, eyelet 227 of a given panel can be configured with somewhat conical bevel dimensions to accept fastener head 210 and/or bearing interface 220 in rotatable fashion. This is also true with respect to the opposing side of the panel, regarding second bearing interface 240 and second beveled ring 230. In particular, the eyelet 227 of a given panel could be configured on opposing sides to directly interface with first bearing interface 220 and second bearing interface 240, with no intermediary beveled components/rings 225, 230.

Yet still further, each of the components described herein can be manufactured as separate or combined components differently from what is described primarily herein. For example, fastener 205 and bearing interface 230 can be formed as a single component. Similarly standoff barrel 235 can be manufactured so that bearing interface 240 and shaft 245 are separate components. One will appreciate that each such variation in component manufacture can impart a unique functionality to the variable angle standoff, and can also (or alternatively) impart different degrees of efficiency for ultimately mounting and object/panel to a support structure.

Accordingly, the present invention may be embodied in a number of specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A variable angle standoff for securing an object, such as a panel, to a structure in a manner that accommodates dimensional variation in the object and in a manner that avoids causing potentially destructive stress to the object, comprising:

a standoff barrel;
a first bearing interface for rotatably securing a first side of an object;
a second bearing interface for rotatably securing a second side of the object; and
a threaded fastener configured to thread through the first bearing interface, the first and second sides of the object, the second bearing interface, and into the standoff barrel, such that the object can be adjustably positioned along a length of the fastener;
wherein:
the standoff barrel further comprises one or more barrel interfaces for mounting the standoff barrel directly to a support structure;
the one or more barrel interfaces comprise an interface for mounting a threaded member directly to the support structure; and
the one or more barrel interfaces comprise a tapped recess that extends throughout the standoff barrel, such that the standoff barrel receives the threaded fastener into the tapped recess on one end of the standoff barrel, and such that the standoff barrel receives the threaded member for mounting to the support structure on an opposing end of the tapped recess.

2. The variable angle standoff as recited in claim 1, wherein the standoff barrel is substantially cylindrical, and wherein each component of the variable angle standoff fits within a cylindrical profile defined by a cylindrical dimension of the standoff barrel.

3. The variable angle standoff as recited in claim 1, further comprising a first beveled component, wherein the first beveled component comprises one or more beveled perforations configured to receive at least the first bearing interface in a rotatable fashion.

4. The variable angle standoff as recited in claim 2, further comprising a second beveled component, wherein the second beveled component comprises one or more beveled perforations configured to receive at least the second bearing interface in a rotatable fashion.

5. The variable angle standoff as recited in claim 4, wherein at least one of the first and second beveled components comprise a disc structure having the one or more beveled perforations formed therein.

6. The variable angle standoff as recited in claim 1, wherein the variable angle standoff is configured to accommodate a change in a curvature of the panel at a point where the variable angle standoff has secured the panel to a support structure without loosening at least one of a mount of the panel to the support structure, and a mount of the panel to the variable angle standoff.

7. The variable angle standoff as recited in claim 3, wherein the first beveled perforation of the first beveled component comprises a conical shape.

8. The variable angle standoff as recited in claim 4, wherein the second beveled perforation of the second beveled component comprises a conical shape.

9. The variable angle standoff as recited in claim 4, wherein the disc structure of the first and second beveled components comprises a conical shape.

10. An adjustable standoff means for use in mounting curved resin panels to a support structure in a secure fashion without causing curves of the resin panels to crack or otherwise destruct, comprising:

a plurality of perforated bearing interfaces and a plurality of beveled rings configured such that, when communicatively coupled together about a curvature of a curved resin panel, the plurality of perforated rings can adjust to the curvature of the resin panel while holding the resin panel tightly against a support structure at a standoff position;

wherein:

the plurality of bearing interfaces each fit rotatably within a beveled perforation of at least one of the plurality of beveled rings without passing through the beveled perforation; and each of the plurality of perforated bearing interfaces are reciprocally fastened to at least one of the plurality of beveled rings one or more threaded means, the one or more threaded means configured to fasten within a shaft of the adjustable standoff means.

11. The adjustable standoff means as recited in claim 10, wherein the threaded means further includes a fastener head configured to at least partially abut at least one of the plurality of perforated bearing interfaces.

12. The adjustable standoff means as recited in claim 10, wherein the adjustable standoff means comprises a standoff barrel having one or more barrel interfaces for mounting the standoff means directly to a support structure.

13. The adjustable standoff means as recited in claim 12, wherein the one or more barrel interfaces comprise an interface for mounting a threaded member directly to the support structure.

14. The adjustable standoff means as recited in claim 10, wherein the adjustable standoff means comprise a tapped recess that extends throughout the standoff means, such that the standoff means receives one or more threaded means into the tapped recess on one end thereof, and such that the standoff means receives one or more threaded means for mounting to the support structure on an opposing end of the tapped recess.

15. The adjustable standoff means as recited in claim 10, wherein at least one of the perforated bearing interfaces comprises a first bearing interface for rotatably securing a first side of the curved resin panel.

16. The adjustable standoff means as recited in claim 15, wherein the plurality of perforated bearing interfaces further comprise a second bearing interface for rotatably securing a second side of the curved resin panel.

17. The adjustable standoff means as recited in claim 10, wherein the threaded means is configured to thread through a first bearing interface, first and second sides of the curved resin panel, and a second bearing interface, such that the curved resin panel can be adjustably positioned along a length of the threaded means.

18. The adjustable standoff means as recited in claim 10, wherein the beveled perforation comprises a conical shape.

19. The adjustable standoff means as recited in claim 10, wherein at least one of the plurality of beveled rings comprises a conical shape.

20. An adjustable standoff means for use in mounting curved resin panels to a support structure in a secure fashion without causing curves of the resin panels to crack or otherwise destruct, comprising:

a plurality of perforated bearing interfaces and a plurality of beveled rings configured such that, when communicatively coupled together about a curvature of a curved resin panel, the plurality of perforated rings can adjust to the curvature of the resin panel while holding the resin panel tightly against a support structure at a standoff position;

wherein:

the plurality of bearing interfaces each fit rotatably within a beveled perforation of at least one of the plurality of beveled rings without passing through the beveled perforation;

each of the plurality of perforated bearing interfaces are reciprocally fastened to at least one of the plurality of beveled rings via one or more threaded means, the one or more threaded means configured to fasten within a shaft of the adjustable standoff means; and the threaded means further includes a fastener head configured to at least partially abut at least one of the plurality of perforated bearing interfaces.

* * * * *

UNITED STATES PATENT AND TRADEMARK OFFICE
CERTIFICATE OF CORRECTION

PATENT NO. : 7,607,854 B1
APPLICATION NO. : 11/424212
DATED : October 27, 2009
INVENTOR(S) : Goodson et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 704 days.

Signed and Sealed this

Twelfth Day of October, 2010

David J. Kappos
*Director of the United States Patent and Trademark Office*